Nov. 10, 1936.                J. L. FOSTER                2,060,188
                            ROD LINE SUPPORT
                           Filed May 5, 1934
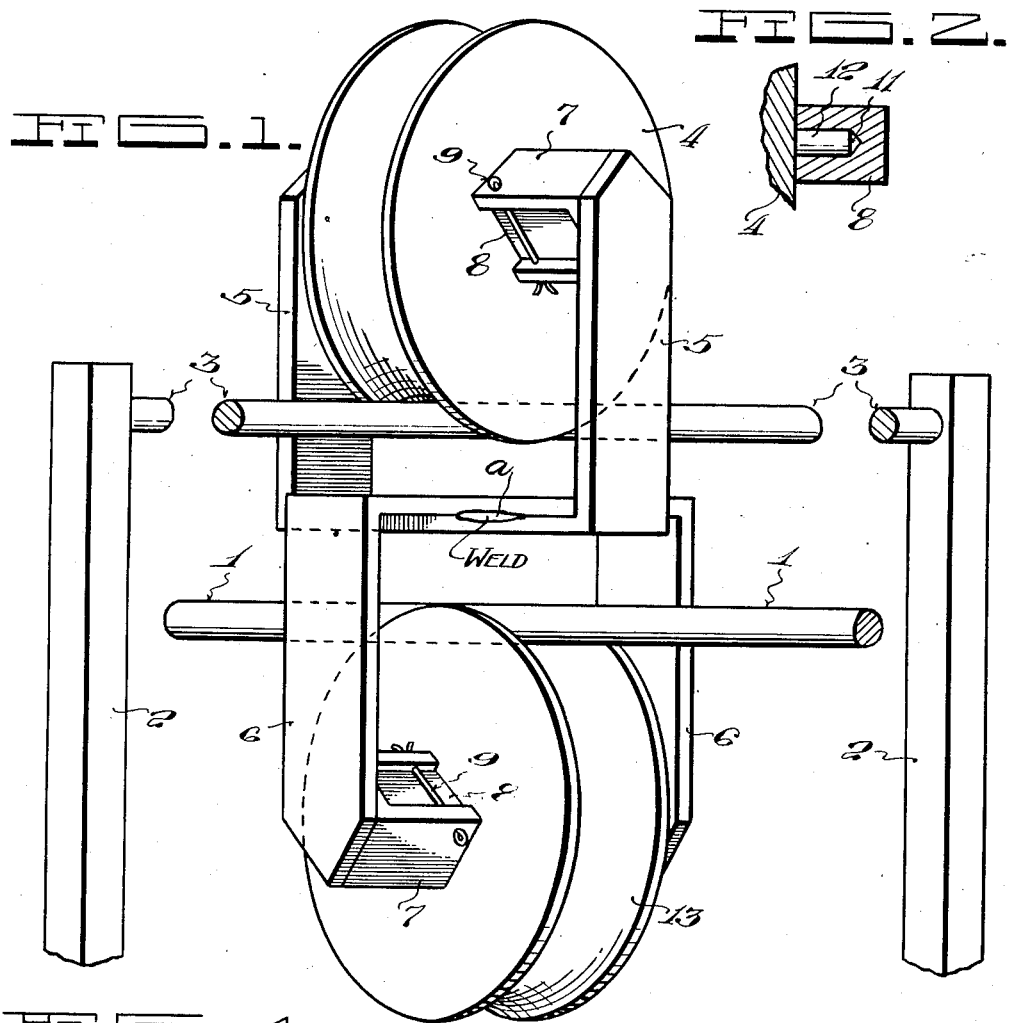
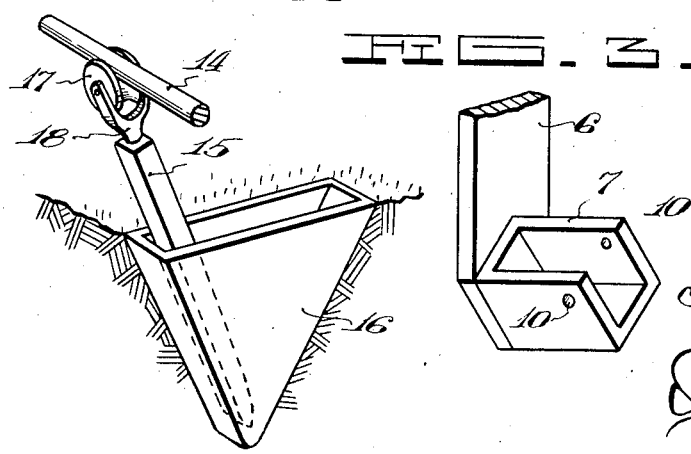
J. L. Foster
INVENTOR
ATTORNEY Patented Nov. 10, 1936

2,060,188

UNITED STATES PATENT OFFICE 2,060,188

ROD LINE SUPPORT

James Lewis Foster, Wichita Falls, Tex.

Application May 5, 1934, Serial No. 724,195

6 Claims. (Cl. 308—6)

This invention relates to well pumping equipment and it has particular reference to pump rod suspensions.

The principal object of the invention is to provide a support or suspension for rod lines of the type used for pumping oil wells, some of which are many hundreds of feet in length. The invention is particularly adapted for use adjacent the power unit to which is connected a number of rod lines, each extending to an individual well, sometimes several hundred feet distant.

Another object of the invention is to provide a rod line support which is capable of adjusting itself to the oscillatory as well as the reciprocatory motion imparted to the rod lines by the power unit, thereby minimizing friction and relieving the power unit and rods of considerable strain.

With the foregoing objects as paramount, the invention has particular reference to its salient features of construction and arrangement of parts which will become manifest as the description proceeds, taken in connection with the accompanying drawing, wherein:—

Figure 1 is a perspective view of one of the rod line supporting devices constructed according to the present invention.

Figure 2 is a detail fragmentary view in section showing one of the bearings to receive the axis of the sheaves employed in the invention.

Figure 3 is a detail view of one of the bearing retainers, and

Figure 4 is a modified form of the invention.

Continuing with a more detailed description of the drawing, I designates a fragmentary section of a rod line which extends from a power unit, usually a band wheel having a pair of eccentrics connected thereto, to an adjacent well, at which point it is connected to a pump jack serving the well. On either side of the rod line there is provided a pair of upright posts 2 having a rod 3 extending from one to the other of these posts. The rod 3 is at right angles and above the rod line 1.

A sheave 4 is mounted upon and adapted to roll on the rod 3. Suspended from the axis of the sheave or pulley is a U-shaped frame or stirrup 5 and to this frame 5 in turn is suspended a similar but inverted frame 6. The frame 6 is at right angles to the frame 5 and is welded at $a$ or otherwise suitably secured in fixed relation to the frame 5. The ends of each of the frames 5 and 6 have secured thereto bearing retainers 7, each being box-like structures to receive bearings 8, preferably composed of wood or composition material and which are retained by cotter keys 9 passing through suitable apertures 10 in the bearing retainer 7.

Each of the bearing blocks 8 is provided with a recess 11 as shown in Figure 2 to receive the shaft or spindle 12 of the sheave.

It will be observed that the bearing retainers 7 which are effective in supporting the lower sheave 13 are disposed at such an angle that the blocks 8 will not be displaced when the weight of the sheave and rod line is imposed thereon. This is true also of the bearing retainers carried by the upper frame 5.

The motion of the power unit necessarily imparts to the rod line 1 adjacent its point of connection thereto a sliding and reciprocating motion. It is at this point or adjacent thereto that the invention serves to support the rod line and it must be capable of responding to the movements of the rod line. It is therefore apparent from the foregoing that upon lateral movement of the rod line 1, the upper sheave 4 will travel along the supporting rod 3 while the sheave 13 moves axially and rotates simultaneously as the rod line 1 reciprocates. Accordingly, there is little friction wear on parts and in view of the supporting action of the invention, much strain ordinarily imposed upon the rod line is eliminated.

In Figure 4 is shown a modified example of the invention and in which 14 designates the rod line. A member 15, preferably of wood, is arranged to follow the movements of the rod line 14 by being positioned in a substantially V-shaped receptacle 16 buried in the earth but having its upper edges flush with the surface of the earth.

The lower end of the member 15 rests upon the bottom of the receptacle 16 and in view of the V-shaped form of the receptacle, the member 15 is constrained to move to and fro and there is little likelihood that its lower end will become dislodged. A sheave 17 is mounted on the upper end of the member 15 and embraces the rod line 14. Thus, it will be seen that as the rod reciprocates, the sheave 17 will rotatably support the rod and as it moves laterally, the member 15 will move to the opposite side of the receptacle 16. Should any movement of the rod require it, the frame 18 which supports the sheave 17 is capable of rotation in order that the sheave 17 may at all times follow the movements of the rod 14.

Manifestly, the construction shown is capable of considerable modification and such modification as is considered within the scope and meaning of the appended claims is also considered within the spirit and intent of the invention.

What is claimed is:

1. A support for rod lines including a rod mounted at right angles to said rod line and above the same a sheave suspended from said latter rod, a second sheave suspended from said first sheave and whose axis is at right angles to said first sheave and rotatably supporting said rod line and arranged to yield to the reciprocatory and oscillatory movements of said rod line.

2. A supporting device for rod lines and the like including a sheave rotatably supporting said rod line, a rod arranged at right angles with respect to said rod line and above the same, a second sheave mounted for movement along said rod and from which said first sheave is suspended whereby the latter will be capable of movement in response to the movements of said rod line.

3. A supporting device for rod lines and the like including a rod supported above and at right angles to said rod line, a sheave mounted for movement along said rod and a second sheave suspended from said latter means and having its rotating axis at right angles to that of said first sheave for rotatably engaging said rod line to suspend the same and respond to its longitudinal movements.

4. A device for supporting rod lines and the like including means arranged above and at right angles to said rod line, a sheave mounted for movement along said rod, a second sheave suspended from said first sheave and whose axis is at right angles to that of said first sheave and arranged to rotatably suspend said rod line.

5. A device of the character described including in combination with a rod line or the like, a pair of uprights on opposite sides of the longitudinal axis of said rod line, a rod interconnecting said uprights, a sheave mounted to travel along said rod, a second sheave whose axis is at right angles to the axis of said first sheave and arranged to suspend said rod line during movement thereof.

6. A device of the character described including in combination with a rod line or the like, a pair of sheaves whose axes are fixed at relative right angles whereby one sheave is capable of supporting said rod line for free reciprocation, the other sheave being capable of rotative movement on a support at right angles to said rod line to yield to the lateral movement of said rod line.

JAMES LEWIS FOSTER.